United States Patent Office 3,423,232
Patented Jan. 21, 1969

3,423,232
PRODUCTION OF VINYLIDENE CHLORIDE POLYMER COATINGS ON FLAT SUBSTRATES BASED ON CELLULOSE
Hans Reinhard, Limburger Palatinate, and Friedrich Hoelscher and Bernhard Dotzauer, Ludwigshafen (Rhine), Germany, assignors to Badische Anilin- & Soda-Fabrik Aktiengesellschaft, Ludwigshafen (Rhine), Germany
No Drawing. Filed Jan. 17, 1966, Ser. No. 545,780
Claims priority, application Germany, Jan. 22, 1965, B 80,217
U.S. Cl. 117—76          4 Claims
Int. Cl. B32b 23/08

This invention relates to a process for the production of coatings, which are odor-impermeable and flexible at freezing temperatures on flat substrates of fibrous materials. More particularly the invention relates to the coating of flat substrates with aqueous dispersions of vinylidene chloride polymers.

For some time there has been particular interest in the use of aqueous dispersions of copolymers consisting preponderantly of vinylidene chloride units for the coating of papers. Materials coated with vinylidene chloride polymers are distinguished by the considerable flavor-protection which they afford and their good oil-resistance and are thus being used increasingly for the production of the most varied type of packages. It is known that coating with aqueous polymer dispersions may be effected by first applying a subcoat of polymers which have a lower content of copolymerized vinylidene chloride units than the polymers subsequently applied as the topcoat which generally contain 80 to 98% by weight of copolymerized vinylidene chloride units. It is also known that butadiene, isoprene or isobutylene polymer dispersions may be used for the production of subcoatings. Although protective papers manufactured in this way possess folding endurance at room temperature, water vapor readily seeps through packages made of these papers when the plastics coating is deformed at temperatures below 0° C., because the said coating is brittle at these temperatures.

The object of the present invention is a process for the production of coatings on flat substrates, particularly of fibrous materials, by using aqueous dispersions of vinylidene chloride polymers, these coatings being odor-impermeable, oil-resistant and heat-sealable, and at the same time possessing folding endurance at temperatures below 0° C.

We have found that coatings on flat substrates based on cellulose and especially fibrous cellulosic materials can be prepared while avoiding the said disadvantages by applying aqueous polymer dispersions as a subcoat and drying same, applying aqueous dispersions of a copolymer of 80 to 98% by weight of vinylidene chloride and 2 to 20% by weight of copolymerizable monoethylenically unsaturated compounds as a topcoat and drying same, if the subcoat is manufactured from mixtures of:

(I) aqueous dispersions of copolymers A of 80 to 98% by weight of vinylidene chloride and 2 to 20% by weight of copolymerizable monoethylenically unsaturated compounds, and
(II) aqueous dispersions of polymers of ethylenically unsaturated compounds B having a glass transition temperature of +10° to —55° C., the amount of the copolymers A being about 35 to 90% and the amount of the polymers B being about 10 to 65% of the weight of the sum of the polymers A and B in the mixture.

Substrates containing cellulose fibers, such as papers and paperlike fibrous materials, as well as combinations of these substrates with metal foils, such as aluminum foil, are particularly suitable as the flat cellulose substrates which may be coated with the said dispersion mixtures.

For the manufacture of the subcoat according to the present invention a mixture of aqueous dispersions of the copolymers A with aqueous dispersions of the polymers B is used. The copolymers A used in the mixture are copolymers of 80 to 98%, preferably 85 to 92%, by weight of vinylidene chloride and 2 to 20%, preferably 8 to 15%, by weight of copolymerizable monoethylenically unsaturated compounds. Copolymerizable monoethylenically unsaturated compounds which are particularly suitable are esters of acrylic and/or methacrylic acid and monohydric aliphatic alcohols containing one to eight, preferably one or two, carbon atoms in the alcohol radical, and vinyl chloride. Acrylonitrile, methacrylonitrile, styrene, vinyl esters of aliphatic monocarboxylic acids having two to twelve carbon atoms, such as vinyl acetate and vinyl propionate, acrylamide, methacrylamide, acrylic acid, methacrylic acid, crotonic acid, maleic acid, fumaric acid, itaconic acid, the monoamides, N-substituted monoamides, esters and monoesters of the said dicarboxylic acids and aliphatic monohydric alcohols containing one to eight carbon atoms in the alcohol radical, maleic anhydride and itaconic anhydride are also suitable. The polar comonomers with hydrophilic groups are used preferably in an amount of about 1 to 5% by weight. The copolymer dispersions may be prepared in the conventional way.

Polymers of ethylenically unsaturated compounds having glass transition temperatures between +10° and —55° C., particularly between —10° and —25° C., are suitable as the polymers B in the mixture. For a definition of glass transition temperature see P. J. Flory, "Principles of Polymer Chemistry," Cornell University Press, Ithaca, N.Y., 1953, page 56, and particularly L. E. Nielsen, "Mechanical Properties of Polymers," New York, 1962, page 11. The glass transition temperature is defined as the temperature at which a polymer in the hard glassy state changes to the plastic rubberlike state, a transition which manifests itself in a discontinuous change in some of its physical and mechanical properties at this temperature. The glass transition temperatures of the polymers used in the present invention were obtained by measuring the oscillations at a frequency of 1 cycle/second (for the method of determining the temperature see K. Illers and H. Breuer, "Kolloid-Z.," 176 (1961), page 110).

Preferred polymers B are copolymers of 40 to 90% by weight of esters of acrylic acid and/or methacrylic acid with monohydric alcohols having two to eight, preferably two to four, carbon atoms in the chain, and 10 to 60% by weight of other conventional monoethylenically unsaturated compounds polymerizable by free radical mechanisms, such as methyl methacrylate, methyl acrylate, styrene, acrylonitrile, vinyl chloride or vinylidene chloride. The copolymers of n-butyl acrylate are particularly suitable. Copolymers of butadiene with e.g. styrene, acrylonitrile or esters of ethylenically unsaturated carboxylic acids having three to five carbon atoms with monohydric aliphatic alcohols having one to eight carbn atoms, e.g diethyl maleate, are also suitable. When polymers which contain at least 10% of copolymerized units of strongly polar monomers, such as acrylonitrile, vinyl chloride or vinylidene chloride, are used, particularly advantageous results are obtained and the coatings have very good processability and flexibility. Thus copolymers of at the most 60%, particularly 20 to 60%, by weight of vinylidene chloride and at least 40%, particularly 40 to 80%, by weight of esters of acrylic acid with monohydric aliphatic alcohols containing three to eight carbon atoms in the alcohol radical have proved very suitable. A considerable degree of latitude is permissible in the variation of the composition of the polymers B.

However the choice of the type and amount of the monomers to be used for the manufacture of the polymers B according to conventional methods is always restricted by the condition that the glass transition temperatures of the resulting polymers B be between $+10°$ and $-55°$ C. All polymers B which fail to fulfil the said condition are unsuitable for the mixtures for subcoats according to this invention. For example a copolymer of 60% by weight of styrene, 38% by weight of tertiary butyl acrylate and 2% by weight of acrylic acid has a glass transition temperature of above $+20°$ C. and is therefore just as unsuitable as, for example, polybutadiene with a glass transistion temperature of about $-60°$ C. or polyisobutylene with a glass transition temperature of about $-65°$ C. On the other hand a copolymer of 75% by weight of butadiene, 15% by weight of styrene and 10% by weight of tertiary butyl acrylate is very suitable (glass transition temperature $-45°$ C.).

The polymers A and B for the mixture are used in the form of aqueous dispersions which generally have a polymer content of 40 to 60% by weight. The polymer dispersions are mixed in such a ratio that the amount of the copolymers A is about 35 to 90%, particularly 40 to 75%, by weight and the amount of the polymers B is about 10 to 65%, particularly 25 to 60%, by weight of the weight of the polymer mixture of A and B. The aqueous dispersions may be mixed in the conventional manner. In order to prevent coagulation at all costs during mixing, it has proved advantageous to adjust the surface tensions of the various dispersions so that they are the same, by adding emulsifiers prior to mixing. Emulsifiers which are particularly suitable for preparing the dispersions and adjusting the surface tension are surface-active salts of sulfonated ethenoxylated alkyl phenols or fatty alcohols and secondary alkyl sulfonates having approximately fourteen to eighteen carbon atoms in the alcohol radical. The aqueous dispersion mixtures may also contain conventional additives, such as heat and light stabilizers, antifoams, thickeners and plasticizers.

The flat substrates may be coated with the dispersion mixtures continuously or batchwise in one or more applications by conventional applicator means, for example by means of doctor knives or rollers, spreading means, flooding means, pouring means or dipping means, and the thickness of the coating can be regulated in the conventional manner. The rate of application of the dispersion mixtures may be varied within wide limits. Rates of application of about 10 to 50, preferably 20 to 30 g. of the polymer mixture per square meter of surface have proved very suitable. The coated materials are then dried by conventional means, for example by exposure to infrared rays or by blowing preheated air on to same. A thin film of the emulsion polymer mixture is quickly formed at the conventional drying temperatures of 80° to 150° C. and the moisture is substantially removed.

The subcoat prepared in this way is then coated in a conventional manner with aqueous dispersions of a copolymer of 80 to 98% by weight of vinylidene chloride and 2 to 20% by weight of copolymerizable monoethylenically unsaturated compounds as the topcoat and the topcoat is dried in the same way as the subcoat. The same monomers as were specified for the manufacture of the copolymer A are suitable here as copolymerizable monoethylenically unsaturated compounds. The composition of the vinylidene chloride copolymers used for preparing the topcoat is the same as or different from the composition of the copolymers A used for the subcoat. The rate of application of the topcoat is generally 5 to 15, preferably 8 to 12 g. of copolymer per square meter of surface.

The coatings manufactured according to the present invention have distinct advantages over conventional types of coating. They are distinguished particularly by their high flexibility at temperatures below 0° C. It has been found that only coatings according to this invention, where the said mixture of polymer dispersions is used for manufacturing the subcoat, exhibit this flexibility when cold. In cases where the subcoat is manufactured from a dispersion of only one copolymer which has the same empirical composition with reference to the base units as the polymer mixtures of A and B, coatings have sufficient flexibility only at temperatures above 0° C. Moreover, when using the mixtures of polymer dispersions according to this invention for the subcoat as opposed to dispersions merely of soft polymers, water vapor permeability is reduced and processability improved, since the subcoats according to this invention have little tendency to block. Thus the coatings with only the subcoat applied may be temporarily rolled up, there being no risk of their sticking. It has furthermore been found that in the case of coatings manufactured according to this process, the minimum sealing temperature of the topcoat is reduced by some 10° C. Such a reduction is an advantage in the manufacture of packages from these coated materials in automatic sealing machines. The coatings manufactured according to this invention have high gloss, are resistant to blocking and oil-resistant. Since these properties are combined with good folding endurance at temperatures below 0° C., the coated materials are outstandingly suitable as packaging materials for oily, fatty and aromatic goods which are stored at low temperatures. They are also suitable for packaging foodstuffs, cosmetic and pharmaceutical preparations, tobacco, tobacco goods, tea, coffee, chemicals, industrial greases and oily dye and pigment formulations.

The invention is illustrated by the following examples. The parts and percentages specified in the examples are by weight.

The cold folding endurance of the materials is determined as follows.

The coated papers (30 x 20 cm.) are kept for a day at temperatures of 0°, $-10°$ and $-20°$ C. By means of a folding machine cooled to the same temperature the papers are folded twice along their length and breadth at the said temperatures in such a way that the coating is compressed and extended once in each direction. The folds running lengthwise and crosswise intersect at an angle of about 90°. The coated papers which have been folded in the cold are then processed at room temperature in a commercial sealing machine into flat bags having an area of 15 x 20 cm.; these bags are then filled with an intensely colored mixture of 90 parts of oil of turpentine and 10 parts of gasoline (boiling point range 60° to 80° C.) and kept at room temperature for four weeks. If the bags are damaged as a result of the strain on the folds in the cold, the colored liquid comes through the folds in the bags and the penetrations are recognizable on the paper side (outside) of the bags by colored spots of varying size.

The blocking properties of the materials to which the subcoat or the subcoat and topcoat have been applied are determined by punching discs with a diameter of 4 cm. out of the coated material, stacking these discs with the coated surfaces facing each other and then subjecting the stack to a pressure of 90 g./cm.$^2$ at 40° C. for about 16 hours. Whereas, in the case of material to which a subcoat has been applied consisting solely of a soft copolymer, the discs cannot be separated without tearing off pieces of paper, in the case of material to which a subcoat or a subcoat and topcoat according to this invention have been applied, the discs can be easily separated without any paper coming away.

The values given in the examples for the water vapor permeability of the coated materials are determined over a period of 24 hours according to DIN 53,122.

EXAMPLE 1

Coating papers having a weight of 80 g./m.$^2$ are coated as described with a mixture of 40 parts of a 55% aqueous dispersion of a copolymer A of 90% vinylidene chloride and 10% methyl acrylate and 55 parts of a 55% aqueous dispersion of a copolymer B of 50% vinylidene chloride and 50% n-butyl acrylate (glass transition temperature about 5° C.), and dried. The rate of application is about 25 g. of polymer mixture per square meter of surface. A 55% aqueous dispersion of a copolymer of 92% vinylidene chloride and 8% methyl acrylate is then applied as the topcoat (rate of application 10 g./m.²). The coating exhibits folding endurance up to −20° C. The water vapor permeability in 24 hours is less than 1 g./m.².

The water vapor permeability of the material to which only the subcoat has been applied is 18 to 20 g./m.² in 24 hours.

EXAMPLE 2

In the same way as in Example 1 papers are coated with a mixture of 50% aqueous dispersions of 65 parts of a copolymer A of 87% vinylidene chloride, 4% of n-butyl acrylate and 9% of methyl acrylate and 65 parts of a copolymer B of 25% vinylidene chloride and 75% n-butyl acrylate (glass transition temperature −17° C.), and dried. The rate of application is about 25 g. of polymer mixture per square meter of surface. A topcoat is applied to the subcoat in the same way as in Example 1. The materials manufactured thus exhibit folding endurance up to −20° C. Their water vapor permeability in 24 hours is less than 1 g./m.².

Materials to which only the subcoat has been applied do not block when subjected to the test described above and have a water vapor permeability of about 19 to 20 g./m.² in 24 hours.

EXAMPLE 3

In the same way as in Example 1 papers are coated with a mixture of 50% aqueous dispersions of 60 parts of a copolymer A of 90% vinylidene chloride and 10% methyl acrylate and 40 parts of a copolymer B of 30% vinylidene chloride and 70% 2-ethylhexyl acrylate (glass transition temperature −25° C.), and dried. The rate of application is about 25 g. of polymer mixture per square meter of surface. A topcoat is applied to the subcoat as in Example 1. The materials manufactured in this way possess folding endurance up to about −20° C. and their water vapor permeability is less than 1 g./m.² in 24 hours.

Comparative experiment 1

A coating paper having a weight of about 80 g./m.² is coated as described above with a 55% aqueous dispersion of a copolymer of 92% vinylidene chloride and 8% methyl acrylate, and dried. The coating is applied in three applications. The overall rate of application is 35 g. of copolymer per square meter of surface. The materials manufactured thus have folding endurance only at temperatures above 0° C. In tests below 0° C. damage to the fold in the form of cracks occurs. The water vapor permeability of the coated materials is less than 1 g./m.² in 24 hours.

Comparative experiment 2

A coating paper having a weight of 80 g./m.² is coated as described above with a mixture of 50% aqueous dispersions of 15 parts of polyisobutylene (glass transition temperature about −65° C.) and 85 parts of a copolymer of 90% vinylidene chloride and 10% methyl acrylate, and dried. The coating is applied in three applications. The overall rate of application is 26 g./m.². The topcoat is then applied to the subcoat as in Example 1. The coated materials exhibit folding endurance only at temperatures above 0° C. and their water vapor permeability is 1 g./m.² in 24 hours.

Comparative experiment 3

Coating is carried out as in Example 1 except that in the preparation of the subcoat instead of the polymer mixture specified there a copolymer of 66% vinylidene chloride, 30% n-butyl acrylate and 4% methyl acrylate is used, i.e. a copolymer with the same percentage composition with reference to the base units as the polymer mixture used in Example 1. The topcoat is also applied as in Example 1. The coated materials exhibit folding endurance only at temperatures up to 0° C., folding at −10° C., causing obvious damage to the coating. The water vapor permeability of the coated materials is 1.5 g./m.² in 24 hours. The water vapor permeability of the coated papers to which only the subcoat has been applied is about 30 to 32 g./m.² in 24 hours. When the paper with the subcoat is subjected to the blocking test described above it is seen that there is considerable blocking and the stacked material cannot be separated without the paper tearing away.

EXAMPLES 4 TO 10

Papers are coated as in Example 1 with mixtures of about 55% aqueous dispersions of the following copolymers and dried.

EXAMPLE 4

A mixture of aqueous dispersions of—
35 parts of a copolymer A of:
    90% vinylidene chloride and
    10% methyl acrylate
and 65 parts of a copolymer B of:
    14% styrene
    14% acrylonitrile
    70% n-butyl acrylate
    1% acrylamide and
    1% acrylic acid (glass transition temperature +6° C.).

EXAMPLE 5

A mixture of aqueous dispersions of—
75 parts of a copolymer A of:
    90% vinylidene chloride and
    10% methacrylate
and 25 parts of a copolymer B of:
    39% vinyl acetate
    60% 2-ethylhexyl acrylate and
    1% sodium acrylate (glass transition temperature −28° C.).

EXAMPLE 6

A mixture of aqueous dispersions of—
80 parts of a copolymer A of:
    90% vinylidene chloride and
    10% methyl acrylate
and 20 parts of a copolymer B of:
    90% n-butyl acrylate
    7% acrylonitrile and
    3% 3-chloro-2-hydroxypropyl acrylate-(1)

(glass transition temperature −27° C.).

EXAMPLE 7

A mixture of aqueous dispersions of—
60 parts of a copolymer A of:
    90% vinylidene chloride and
    10% methyl acrylate
40 parts of a copolymer B of:
    99% ethyl acrylate and
    1% acrylic acid (glass transition temperature −17° C.).

EXAMPLE 8

A mixture of aqueous dispersions of—
80 parts of a copolymer A of:
    90% vinylidene chloride and
    10% methyl acrylate
and 20 parts of poly-n-butyl acrylate (glass transition temperature −54° C.).

EXAMPLE 9

A mixture of aqueous dispersions of—

35 parts of a copolymer A of:
  90% vinylidene chloride and
  10% methyl acrylate
and 65 parts of a copolymer B of:
  51% vinyl chloride
  48% n-butyl acrylate and
  1% acrylamide (glass transition temperature +3° C.).

EXAMPLE 10

A mixture of aqueous dispersions of—

15 parts of a copolymer A of:
  90% vinylidene chloride and
  10% methyl acrylate
and 75 parts of a copolymer B of:
  75% butadiene
  15% styrene and
  10% tertiary butyl acrylate (glass transition temperature −45° C.).

The rate of application in each case is about 25 g. of polymer mixture per square meter of surface. An about 55% dispersion of a copolymer of 92% vinylidene chloride and 8% methyl acrylate is applied to the dry subcoat in a conventional manner in each case and the coating is then dried. The rate of application of the topcoat is about 10 g. of copolymer per square meter of surface. All the coated materials prepared in this way still exhibit folding endurance at −20° C. and have a water vapor permeability of less than 1 g./m.$^2$ in 24 hours.

We claim:

1. In a method for the production of coatings on flat substrates based on cellulose by applying an aqueous polymer dispersion as a subcoat and drying the same, applying an aqueous dispersion of a copolymer of 80 to 98% by weight of vinylidene chloride and 2 to 20% by weight of copolymerizable monoethylenically unsaturated compounds as a topcoat and drying the same the improvement which comprises using as aqueous polymer dispersion for the subcoat a mixture of:

(I) an aqueous dispersion of a copolymer A of 80 to 98% by weight of vinylidene chloride and 2 to 20% by weight of copolymerizable monoethylenically unsaturated compounds, and (II) an aqueous dispersion of a polymer of ethylenically unsaturated compounds B having a glass transition temperature of +10° to −55° C., the amount of the copolymer A being about 35 to 90% and the amount of the polymer B being about 10 to 65% of the weight of the sum of the polymers A and B in the mixture.

2. The improvement as claimed in claim 1, wherein the polymers B having glass transition temperatures between +10° and −55° C. are copolymers of 40 to 90% by weight of esters of ethylenically unsaturated carboxylic acids selected from the group consisting of acrylic acid and methacrylic acid with monohydric aliphatic alcohols having 2 to 8 carbon atoms in the alcohol radical, and 10 to 60% by weight of other monoethylenically unsaturated compounds.

3. The improvement as claimed in claim 1, wherein paper is used as the flat substrate based on cellulose.

4. Flat substrates based on cellulose which have been coated with:

(a) a subcoat comprising a mixture of:
    (I) 35 to 90% by weight of a copolymer A of 80 to 98% by weight of vinylidene chloride and 2 to 20% by weight of copolymerizable monoethylenically unsaturated compounds, and
    (II) 10 to 65% by weight of polymers of ethylenically unsaturated compounds B with a glass transition temperature of +10° to −55° C., and
  (b) a topcoat comprising a copolymer of:
    80 to 98% by weight of vinylidene chloride and
    2 to 20% by weight of copolymerizable monoethylenically unsaturated compounds.

References Cited

UNITED STATES PATENTS

| | | | |
|---|---|---|---|
| 2,748,027 | 5/1956 | Meier | 117—76 |
| 3,307,965 | 3/1967 | Seifer et al. | 117—76 |

WILLIAM D. MARTIN, *Primary Examiner.*

R. HUSACK, *Assistant Examiner.*

U.S. Cl. X.R.

117—155, 161, 75

UNITED STATES PATENT OFFICE
CERTIFICATE OF CORRECTION

Patent No. 3,423,232

January 21, 1969

Hans Reinhard et al.

It is certified that error appears in the above identified patent and that said Letters Patent are hereby corrected as shown below:

Column 7, line 16, "/5" should read -- 75 --; line 20, "75" should read -- 25 --.

Signed and sealed this 21st day of April 1970.

(SEAL)

Attest:

Edward M. Fletcher, Jr.
Attesting Officer

WILLIAM E. SCHUYLER, JR.
Commissioner of Patents